3,112,818
SYNCHRONOUS MOTOR
Lee A. Woolley, Kokomo, Ind., assignor to Kingston Products Corporation, Kokomo, Ind., a corporation of Indiana
Filed Sept. 6, 1961, Ser. No. 136,317
5 Claims. (Cl. 192—4)

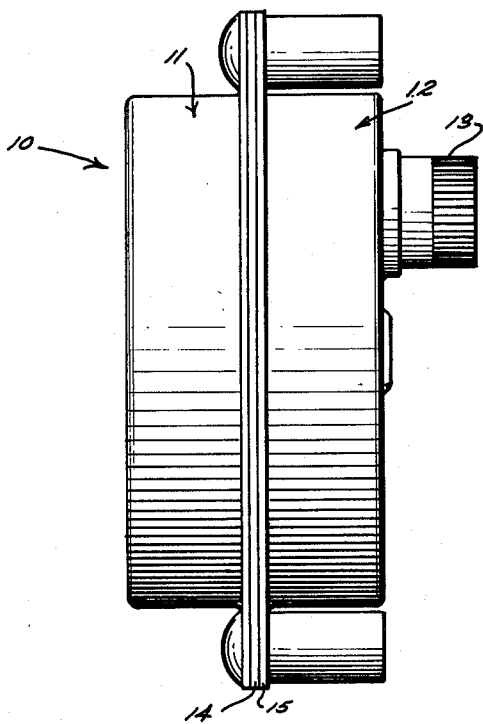
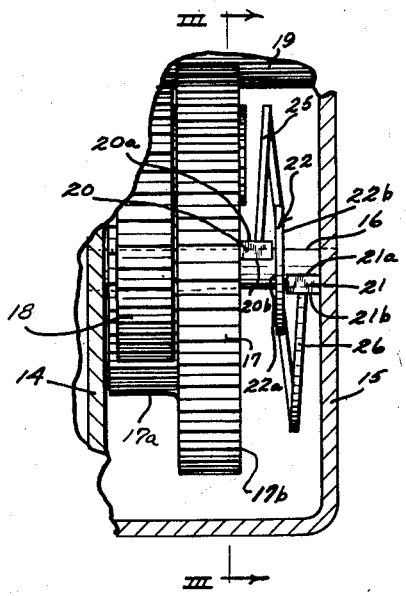
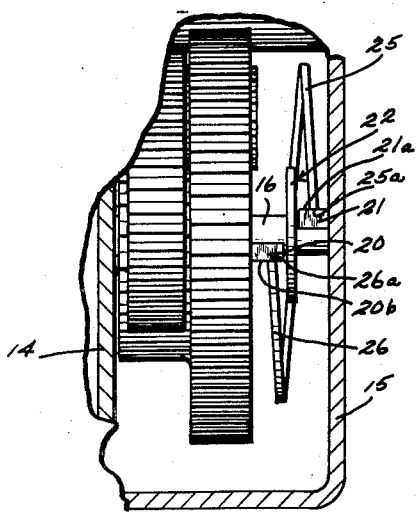
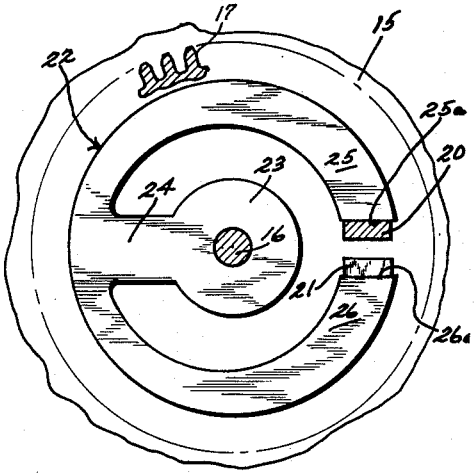

This invention relates generally to synchronous motors and more specifically to an improved structure for insuring that the synchronous motor will run continually in a predetermined direction.

Although the principles of the present invention may be included in synchronous motors of various types, a particularly useful application is made in a self-starting synchronous motor of the clock type which incorporates a gear train within the structure of the device.

Various mechanisms have previously been proposed for mechanically reversing the direction of rotation of a motor when it starts in the wrong direction. Various problems have arisen in connection with their manufacture and use, for example, some have been too expensive to manufacture and others have been unreliable. Cost of prior known forms of the too expensive type has been determined by the amount of labor and material going into the same.

In accordance with the principles of the present invention, I have provided a mechanism for insuring that a self-starting synchronous motor will run in the correct direction, or predetermined direction, by reversing the motor operation when it starts in the opposite direction. To this end, my structure includes three basic elements, namely two abutments and a stop member. The abutments are so fashioned that in a preferred embodiment, they comprise an integral part of other parts normally included in the motor assembly and are manufactured at the same time without any added labor. The stop member is adapted to be manufactured as a stamping, thereby minimizing the cost thereof, and is further adapted to be assembled without the use of any added rivet, screw, or similar holding or fastening means.

Accordingly, it is an object of this invention to provide an improved means for insuring that a self-starting synchronous motor will run continually in a predetermined direction.

A further object of the present invention is to provide a mechanism of the type described which is adapted to be manufactured and assembled into the motor assembly for an absolute minimum cost.

A still further object of the present invention is to provide a mechanism of the type described which can be utilized to insure running of the synchronous motor selectively in either direction.

Other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is an enlarged side elevational view of a synchronous motor provided with the improved direction controlling means in accordance with the principles of the present invention;

FIGURE 2 is a further enlarged fragmentary cross-sectional view of a portion of FIGURE 1;

FIGURE 3 is a cross-sectional view, partially broken away, taken along line III—III of FIGURE 2; and FIGURE 4 is a view corresponding to FIGURE 2 wherein the stop member has been re-formed to insure motor operation in the opposite direction.

As shown on the drawings:

The principles of this invention are particularly useful when embodied in a unitized synchronous electric motor assembly such as illustrated in FIGURE 1, generally indicated by the numeral 10. The motor assembly 10 includes a motor section 11 having a rotor connected to positively drive a gear train section 12 having therein a gear train which drives an output pinion 13. The motor section 11 and the gear train section 12 are separately encased, so that upon separation of the cases thereof, ready access may be had to the gear train for a purpose described below.

The casing of the gear train section supports the gear train, a representative portion of which is illustrated in FIGURE 2. Since the case performs this function, it is also referred to herein as a frame which, in this embodiment, comprises complemental case or frame elements 14, 15. A support pin 16 is staked to one of the frame elements 14, 15, and has a sliding fit with the other of such elements whereby at least the portion of the gear train here described may be assembled readily prior to closing of the case. The gear train includes a molded rotary element or gear 17 having an integral pinion portion 17a which meshes with and drives a gear 18. The gear 17 is driven by a pinion 19 which is operatively connected to the rotor (not shown). The gear 17 includes an integral molded rigid abutment 20 having oppositely directed abutment faces 20a, 20b. The abutment 20 is integral with an axially directed face 17b of the gear 17 and it projects therefrom toward the case or frame element 15 in a direction substantially parallel to the axis of rotation or the axis of the support pin 16. The point at which the abutment 20 mates or joins with the gear 17 is radially offset or is eccentric to the support pin 16 or axis of rotation, as best seen in FIGURE 3.

A second abutment 21 comprises a rigid integral finger struck up from the frame or case element 15, it thus comprising a rigidly supported rigid abutment. As best seen in FIGURE 2, the abutment 21 projects toward the gear 17 in a direction substantially parallel to the first abutment, and thus parallel to the rotational axis or support pin 16. As best seen in FIGURE 3, the abutment 21 likewise is integral with the case element or frame at a point which is radially offset from or eccentric to the rotational axis or support pin 16, the amount of offset or eccentricity being substantially identical to that of the abutment 20. The abutment 21 likewise has a pair of oppositely directed abutment faces 21a and 21b.

The abutments 20 and 21 are axially spaced from each other and receive therebetween a stop member 22, as best seen in FIGURE 2, the shape of which stop member 22 is best shown in FIGURE 3. Thus the abutment 20 projects toward an axially directed side 22a of the stop member 22 while the abutment 21 projects toward the opposite axially directed side 22b of the stop member 22.

As best seen in FIGURE 3, the stop member 22 includes an annular portion 23 which receives the support pin 16 therethrough, which pin supports the stop member 22 for free angularly rotatable floating support, the stop member 22 being rotatable with respect to both the frame or case element 15 and with respect to the gear 17. Thus also, the stop member 22 has an axial spacing between it and the stationary frame as well as between it and the adjacent concentric or coaxial gear. The gear 17 is hollow and likewise is rotatably supported on the support pin 16, and thus the stop member is supported independently of the gear 17.

The stop member 22 further includes a neck portion 24 integral with the annular portion 23, which in turn is integral with a pair of resilient fingers 25, 26. Each of the fingers 25, 26 is arcuate and tapers to a progressively wider dimension from the supporting neck 24 circularly about the rotational axis so that the stop member 22 is statically balanced. Each of the fingers 25 and 26 terminates at their free or distal end in a stop surface 25a and 26a. The stop surfaces 25a and 26a are disposed in generally confronting relation to each other, and as best seen in FIGURE 2, are offset in opposite axial directions. The stop member 22 preferably comprises a material which has the property of being permanently bent to take a permanent set when adequately stressed, such set being here needed for the fingers 25 and 26 in an axial direction. As stated earlier, the stop member 22 is normally fabricated as a stamping from flat material. When the fingers are offset in opposite axial directions as shown in FIGURE 2, the motor assembly 10 will run in a certain predetermined direction. When the fingers 25 and 26 are offset from each other in a direction opposite to that shown in FIGURE 2, namely to that shown in FIGURE 4, the predetermined direction will be reversed. Inasmuch as the motor assembly can be disassembled, it is evident that a stop member 22 having oppositely offset fingers 25, 26 may be substituted to reverse the motor direction, or that the stop member 22 may be re-formed or re-bent to effect a continual running of the motor in the opposite direction of rotation.

When the rotary element or gear 17 is driven in a clockwise direction as shown in FIGURE 3, the integral abutment 22 will move in a clockwise direction away from the stop face 25a, and will rub along the length of the finger 25 after the gear has turned a little more than 180°, slip off the end at the stop surface 25a and continue running indefinitely. During such rotation of the gear 17, it is evident that there is no positive driving connection between the gear 17 and the stop member 22, whereby the stop member 22 may angularly float or partially rotate about the support pin 16, also in a clockwise direction wherein the stop surface 26a may move away from the abutment 21. If rotation of the stop member 22 should continue, the finger 26 might slip off the end of the abutment 21 in the same manner described for the finger 25.

However, if the gear 17 is driven in the opposite angular direction, counterclockwise as shown in FIGURE 3, the abutment 20 will engage the stop surface 25a with its abutment face 20a and positively drive the stop member in a counterclockwise direction until the stop surface 26a positively engages the abutment face 21b on the abutment 21. There being considerably energy in the rotating parts, when these two engagements occur, the gear 17 will be arrested in movement and be caused to rebound in the opposite or clockwise direction, which rebound or opposite movement is transmitted backwards through the gear train, namely through the rotor pinion 19, to impart a reverse movement to the rotor, which will then continue to operate in the desired or predetermined direction, wherein the gear 17 is driven clockwise as shown in FIGURE 3.

It is evident that when the fingers 25 and 26 are oppositely axially offset as shown in FIGURE 4, the abutment 20 will engage its abutment face 20b with the stop surface 26a on the stop member 22, to cause the stop surface 25a to positively engage the abutment face 21a, thereby causing a rebound in the opposite direction.

It is thus evident that the stop member 22 will cooperate with the abutments 20 and 21 to arrest movement of the gear 17 in only one direction and to initiate rotation thereof in the opposite or predetermined or desired direction.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a synchronous electric motor assembly, a structure for insuring that the motor will run continually in a predetermined direction, comprising:
   (a) a rotatably driven element having a first abutment disposed eccentrically thereon and movable therewith;
   (b) a second abutment supported in a fixed stationary position eccentric to the rotational axis of said driven element; and
   (c) a stop member having means normally supporting said stop member for free rotation about said axis and with respect to both of said abutments, said stop member being positively engaged and rotated by said first abutment only when the motor begins to run in a direction opposite to said predetermined direction, and said stop member being thereby driven into positive engagement with said second fixed abutment, for thereby arresting the movement of, and effecting an angular rebounding by, said rotatably driven element.

2. A structure in accordance with claim 1 in which said supporting means is axially spaced from said rotatably driven element.

3. A structure in accordance with claim 1 including a stationary motor frame with which said fixed abutment is integral.

4. In a synchronous electric motor assembly, a structure for insuring that the motor will run continually in a predetermined direction, comprising:
   (a) a rotatably driven element having a first abutment disposed eccentrically thereon and movable therewith;
   (b) a second abutment supported in a fixed stationary position eccentric to the rotational axis of said driven element; and
   (c) a stop member including an annular portion, a neck portion extending radially from said annular portion, and a pair of resilient arcuate fingers extending from the outer end of said neck portion in opposite angular directions, said annular portion normally supporting said stop member for free rotation about said axis and with respect to both of said abutments, one of said fingers being positively engaged by said first abutment to rotate the stop member only when the motor begins to run in a direction opposite to said predetermined direction, and the other of said fingers being thereby driven into positive engagement with said second fixed abutment, for thereby arresting the movement of, and effecting an angular rebounding by, said rotatably driven element.

5. In a synchronous electric motor assembly, a structure for insuring that the motor will run continually in a predetermined direction, comprising:
   (a) a rotatably driven element having a first abutment disposed eccentrically thereon and movable therewith, said first abutment having a pair of oppositely directed abutment faces;
   (b) a second abutment supported in a fixed stationary position eccentric to the rotational axis of said driven element, said second abutment having a pair of oppositely directed abutment faces; and
   (c) a stop member having means normally supporting said stop member for free rotation about said axis and with respect to both of said abutments, said stop member including a pair of resilient arcuate fingers extending in opposite angular directions about said axis, the distal ends of said fingers being axially offset from each other, said fingers comprising material which has the property of being selectively permanently bendable, one of said fingers being positively engaged by one abutment face of said first abutment to rotate the stop member only when the motor begins to run in a direction opposite to said predetermined direction, and the other of said fingers being thereby driven into positive engagement with one abutment face of said second fixed abutment, for thereby arresting the movement of, and effecting an angular rebounding by, said rotatably driven element, said one of said fingers being positively engaged by the other abutment face of said first abutment to rotate said other of said fingers into positive engagement with the other abutment face of said second fixed abutment when said fingers are permanently bent to an opposite axial offset to reverse said predetermined direction.

References Cited in the file of this patent

UNITED STATES PATENTS

| | | |
|---|---|---|
| 2,631,446 | Meyer | Mar. 17, 1953 |
| 2,766,863 | Berg | Oct. 16, 1956 |
| 2,962,913 | Martin | Dec. 6, 1960 |